May 22, 1945.  E. V. STATIA, SR  2,376,458
MEASURING INSTRUMENT
Filed April 19, 1943
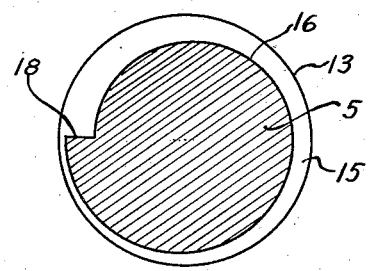
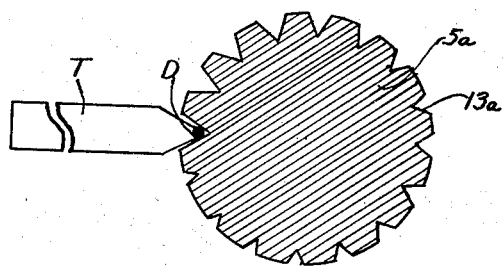
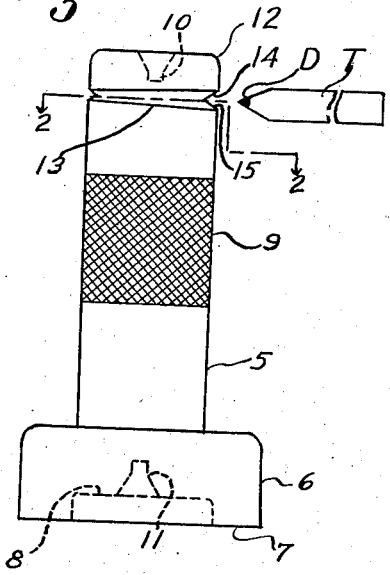
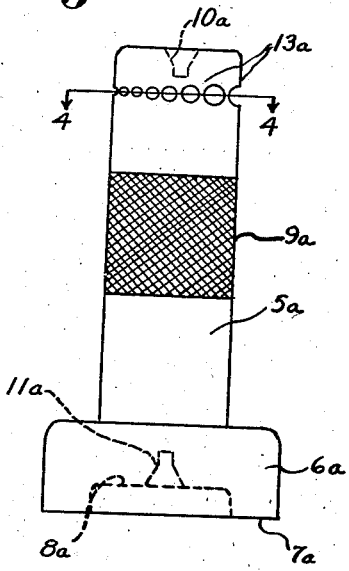
Inventor
Edwin V. Statia Sr.
By Barthel + Bugbee
Attorney Patented May 22, 1945

2,376,458

UNITED STATES PATENT OFFICE 2,376,458

MEASURING INSTRUMENT

Edwin V. Staiia, Sr., Royal Oak, Mich., assignor of one-half to Edward L. Chapman, Detroit, Mich.

Application April 19, 1943, Serial No. 483,559

7 Claims. (Cl. 33—185)

The present invention relates to measuring instruments and more particularly, to a center gauge for cutting tools.

The primary object of the invention is to provide a gauge for determining the center line of grinding wheel dressing tools so as to locate the center of the diamond point when setting the dresser for operation upon a piece of work or while dressing the contour of a grinding wheel to facilitate extreme accuracy and precision in the finished product.

Another object of the invention is to provide a center gauge of the above-mentioned type which will quickly and easily position the diamond point cutting tool on an absolute center line regardless of the extent of wear of the diamond point or its shape from wear.

Another object of the invention is to provide a gauge which will be readily accessible and may at all times be available for use and which will eliminate the use of extensive calculation and computation in locating the exact position of the dresser tool center line with respect to a reference point or base.

Other objects and advantages of the invention will become apparent during the course of the following description of the accompanying drawing, wherein:

Figure 1 is a side elevational view of the gauge illustrating a preferred embodiment of the invention and showing the manner in which the gauge may be presented to a dresser cutter for determining the center line thereof;

Figure 2 is a horizontal cross sectional view taken on line 2—2 of Figure 1, looking in the direction of the arrows and illustrating the gauge groove and the manner in which it is increasingly enlarged through 360 degrees of arc.

Figure 3 is a side elevational view of a modified form of the invention illustrating individual openings or conical recesses of various sizes for receiving the dressing tool; and Figure 4 is a horizontal cross sectional view taken on line 4—4 in Figure 3 illustrating the manner in which the gauge is presented to the diamond point of a dressing tool for determining the exact and absolute center line thereof.

In the drawing wherein for the purpose of illustrating the invention and wherein like reference characters will be employed to designate like parts throughout the same, the reference character 5 in Figures 1 and 2 will generally be employed to designate a rounded vertical standard having a pedestal or base portion 6 with a relatively flat bottom wall 7 undercut as at 8 to facilitate the easy sliding movement of the base 6 upon a relatively flat or plane surface. The round standard 5 is knurled as at 9 intermediate its length to facilitate rotation thereof during use about the axis of the centers 10 and 11. The extreme upper end of the vertical standard 5 is rounded as at 12 to provide a finished appearance.

Spaced slightly below the rounded upper edge 12 is a groove 13 having inclined walls 14 and 15 which gradually increase through 360 degrees of arc. The center line 16 of the groove is absolutely horizontal and is perpendicular to a line between the centers 10 and 11. The walls 14 and 15 of the groove are substantially at an angle of 60 degrees with respect to one another to produce the best results.

It is to be noted that the groove 13 shown in Figures 1 and 2 gradually increases from a peripheral point on the vertical standard 5 in one direction and terminates at this peripheral point 18 in an abrupt shoulder as shown in Figure 2.

In use, the vertical standard 5 is presented to a dressing tool T having a diamond point D so that the diamond point will be received therein. By rotating the vertical standard 5 until a snug fit is obtained between the diamond point D and groove 13, the exact center line of the diamond point D may be determined with reference to a predetermined height from the base or bed upon which the cutting tool T is supported. By grasping the knurled portion 9 the vertical standard 5 may be easily rotated and since the apex 16 of the groove is a predetermined height from the bottom wall 7 the exact and absolute location of the center line extending through the diamond point D in a horizontal plane may be determined. As shown in Figure 1, the diamond point D is provided with a relatively sharp point but upon use it has been found that such diamond points become worn and rounded on the end. For conditions of this nature, it is simply necessary to present the groove 13 to the point or diamond tip D so that the curved portions will contact the opposite walls 14 and 15. When the diamond point D has been snugly received in the groove 13 it will be found that the center of the diamond point D is a predetermined distance above the bed or base from the reference point 7.

In Figures 3 and 4, a slightly modified form of the invention is shown and the reference character 5a will generally be employed to designate a vertical standard having a base portion 6a adapted to rest upon a machine bed or work table. The base 6a is provided with a relatively flat bottom wall 7a undercut as at 8a to provide a relatively stable support for the vertical standard 5a and insure the same extending perpendicular to a base upon which the device is supported. The intermediate portion of the vertical standard 5a is knurled as at 9a so that the operator may grasp the vertical standard and conveniently locate the same while the base 7a is resting upon a substantially flat plane surface. The lathe centers 10a and 11a at opposite ends of the gauge define a line absolutely perpendicular to the bottom wall 7a and provide for accuracy in determining the center line of a grinding dressing tool or other cutting tool.

Formed at a predetermined distance above the bottom wall 7a and adjacent the upper end of the vertical standard 5a is a series of conical recesses 13a gradually increasing in size and depth about 360 degrees on substantially the same gradient as the groove 13 shown in Figs. 1 and 2. The conical openings or recesses 13a are adapted to receive the diamond point D of a dresser tool T for determining the center line of said diamond point D when setting the dresser to its zero marking to various reference points. In other words, the center line of the diamond point D will be a predetermined height above the work surface when the diamond point D is snugly received in one of the conical recesses 13a so that by setting the dressing tool indicator at its zero marking the operator will know with a high degree of accuracy the amount of adjustment to impart to the dressing tool T with the center line as a reference point for said adjustments.

It is to be understood that the forms of the invention herewith shown and described are to be taken as preferred embodiments of the same and that various changes in the shape, size and arrangement of parts may be resorted to without departing from the spirit of the invention or the scope of the subjoined claims.

What I claim is:

1. A gauge for determining the center line of dressing tools, comprising a base, a perpendicular member formed on the base, said perpendicular member having gauging surfaces gradually increasing in depth about said perpendicular member adapted to receive the end of said dressing tool for determining the center line thereof.

2. A gauge for determining the center line of a dressing tool, comprising a base having a plane bottom surface adapted to rest upon a work bed, a vertical standard extending perpendicular to the base and diamond point gauging surfaces having sloping walls gradually increasing in depth, said gauging surfaces being formed in the upper end of said vertical standard about the axis thereof at a predetermined distance above the surface of the base.

3. A gauge for determining the center line of dressing cutters comprising a base having a relatively plane bottom wall adapted to rest on a true surface, a vertical standard formed on the base and extending perpendicular thereto, said vertical standard having formed adjacent the upper end thereof gauging surfaces having sloping walls gradually increasing in depth about the circumference of said standard, the apex of said sloping walls being a predetermined height above the bottom wall of the base to receive the diamond point of a cutting tool.

4. A gauge for determining the center line of dressing tools, comprising a round base having a substantially plane bottom wall surface, a vertical standard projecting above the base having formed therein an annular groove increasing in depth about an arc of 360 degrees, the apex of said groove being substantially horizontal and perpendicular to the vertical standard for receiving the diamond point of a dressing tool to determine the center line thereof.

5. A gauge for determining the center line of grinding wheel dressing tools comprising a base having a relatively plane bottom wall surface, a vertical standard formed integral with the base, said vertical standard having a groove formed in the upper end thereof a predetermined height from the base bottom wall portion, said groove being increased about an arc of 360 degrees and having its apex center line absolutely horizontal and perpendicular to the vertical standard for receiving the diamond point of a cutting tool of various sizes and shapes.

6. A gauge for determining the center line of cutting tools, comprising a base having a relatively flat bottom wall, a vertical standard extending upwardly from the base and a series of conical recesses formed on the peripheral surface of said vertical standard a predetermined distance above the base, said recesses being gradually increased through 360 degrees around the periphery of the vertical standard.

7. A gauge for determining the center line of grinding wheel dressing tools comprising a base having a relatively flat bottom wall surface, a round vertical standard extending upwardly from the base having a knurled intermediate portion and a series of gradually increasing conical recesses formed in the upper end of the vertical standard adapted to receive the diamond point of a cutting tool in determining the center thereof, said conical recesses having their apex points on a horizontal line parallel with the substantially flat bottom wall surface and being of gradually increasing depth through 360 degrees.

EDWIN V. STATIA, Sr.